(12) United States Patent
Miyazaki et al.

(10) Patent No.: US 8,944,198 B2
(45) Date of Patent: Feb. 3, 2015

(54) EXHAUST SYSTEM FOR BATTERY IN VEHICLE

(75) Inventors: Shogo Miyazaki, Shizuoka-Ken (JP); Hiroyuki Kawashima, Shizuoka-Ken (JP); Tomoaki Morikawa, Shizuoka-Ken (JP)

(73) Assignee: Suzuki Motor Corporation, Hamamatsu-shi, Shizuoka-Ken (JP)

( * ) Notice: Subject to any disclaimer, the term of this patent is extended or adjusted under 35 U.S.C. 154(b) by 759 days.

(21) Appl. No.: 13/237,367

(22) Filed: Sep. 20, 2011

(65) Prior Publication Data

US 2012/0070706 A1 Mar. 22, 2012

(30) Foreign Application Priority Data

Sep. 21, 2010 (JP) ................................. 2010-210967

(51) Int. Cl.

| | |
|---|---|
| *B60R 16/03* | (2006.01) |
| *B60L 11/18* | (2006.01) |
| *B60L 1/00* | (2006.01) |
| *B60L 3/00* | (2006.01) |
| *B60L 3/04* | (2006.01) |
| *H01M 10/0525* | (2010.01) |
| *H01M 10/34* | (2006.01) |

(Continued)

(52) U.S. Cl.
CPC ............. *B60L 11/1877* (2013.01); *B60L 1/003* (2013.01); *B60L 3/0007* (2013.01); *B60L 3/0046* (2013.01); *B60L 3/0069* (2013.01); *B60L 3/04* (2013.01); *B60L 11/1803* (2013.01); *B60L 11/1874* (2013.01); *H01M 10/0525* (2013.01); *H01M 10/345* (2013.01); *H01M 10/48* (2013.01); *H01M 10/52* (2013.01); *B60L 2240/545* (2013.01); *B60L 2240/547* (2013.01); *B60L 2250/10* (2013.01); *Y02T 10/7005* (2013.01); *Y02T 10/7011* (2013.01); *Y02T 10/705* (2013.01); *Y02E 60/122* (2013.01); *Y02E 60/124* (2013.01)
USPC ............ 180/68.5; 180/271; 180/65.1; 454/75

(58) Field of Classification Search
USPC ........ 180/65.1, 68.5, 271; 340/436, 438, 455; 454/75
See application file for complete search history.

(56) References Cited

U.S. PATENT DOCUMENTS

| | | | |
|---|---|---|---|
| 5,246,083 A * | 9/1993 | Graf et al. ..................... | 180/271 |
| 5,323,872 A * | 6/1994 | Yabe ............................. | 180/271 |
| 5,490,572 A * | 2/1996 | Tajiri et al. ................... | 180/65.1 |

(Continued)

FOREIGN PATENT DOCUMENTS

| | | |
|---|---|---|
| JP | 06217412 | 8/1994 |
| JP | 07073906 | 3/1995 |

(Continued)

*Primary Examiner* — J. Allen Shriver, II
*Assistant Examiner* — Emma K Frick
(74) *Attorney, Agent, or Firm* — Barnes & Thornburg LLP

(57) ABSTRACT

A vehicle generally includes a motor that drives wheels of the vehicle, a high voltage battery that supplies electric power to the motor, and an exhaust system that exhausts a gas generated by the high voltage battery from the vehicle. The exhaust system for a battery includes an exhaust fan that exhausts the gas generated by the high voltage battery, a control unit that controls operation of the exhaust fan, and a collision detection unit that detects a collision of the vehicle. The control unit has a structure that operates the exhaust fan when the collision detection unit detects a collision of a vehicle.

2 Claims, 7 Drawing Sheets

(51) Int. Cl.
*H01M 10/48* (2006.01)
*H01M 10/52* (2006.01)

(56) References Cited

U.S. PATENT DOCUMENTS

| | | | |
|---|---|---|---|
| 6,204,769 B1 * | 3/2001 | Arai et al. | 340/632 |
| 7,654,351 B2 * | 2/2010 | Koike et al. | 180/68.5 |
| 7,688,582 B2 * | 3/2010 | Fukazu et al. | 361/690 |
| 7,900,727 B2 * | 3/2011 | Shinmura | 180/68.1 |
| 7,997,966 B2 * | 8/2011 | Yoda | 454/339 |
| 8,563,151 B2 * | 10/2013 | Matsumoto et al. | 429/82 |

FOREIGN PATENT DOCUMENTS

| | | |
|---|---|---|
| JP | 11195437 | 7/1999 |
| JP | 3864538/11234801 | 8/1999 |
| JP | 2004312920 | 11/2004 |
| JP | 2007320426 | 12/2007 |
| WO | WO 2009/150965 * | 12/2009 |

* cited by examiner

EXHAUST SYSTEM FOR BATTERY IN VEHICLE

PRIORITY CLAIM

This patent application claims priority to Japanese Patent Application No. 2010-210967, filed 21 Sep. 2010, the disclosure of which is incorporated herein by reference in its entirety.

BACKGROUND

1. Field

Disclosed embodiments relate to an exhaust system for a battery in a vehicle, and more particularly, to an exhaust system for a battery in a vehicle such as an electric car (vehicle) (battery car) or a hybrid car (vehicle) including a motor that drives driving wheels, and two batteries, including a high voltage battery that supplies electric power to the motor and a low voltage battery that supplies electric power to a control system and auxiliaries.

2. Related Art

Vehicles such as hybrid vehicles or electric vehicles include a motor that drives wheels and two batteries with different voltages including a high voltage battery that supplies electric power to the motor and a low voltage battery that drives electrical components and auxiliaries.

The high voltage battery is generally housed in a casing (hereinafter referred to as a battery case) made of metal or the like in terms of protection from an impact, or invasion or entry of foreign matters and preventing a driver from touching a high voltage component. The high voltage battery may be heated by charge and discharge, which may result in reduction in performance or life. Thus, there are proposed a unit for introducing air in a vehicle interior such as cabin into a battery case by using a cooling fan to cool a battery when a battery temperature increases as disclosed, for example, in Japanese Patent Laid-Open Publication No. 11-195437 (Patent Document 1), and a method of introducing a cold air of an air conditioner for adjusting a temperature in a cabin directly into a battery case by using a duct to cool a battery as disclosed, for example, in Japanese Patent Laid-Open Publication No. 7-73906 (Patent Document 2).

On the other hand, the high voltage battery may emit a harmful gas (a hydrogen gas for a nickel hydrogen battery, a carbon monoxide gas for a lithium ion battery, or the like) when an abnormality occurs such as an internal short-circuit of a battery cell due to a collision of a vehicle, or overcharge thereof. In order to prevent the harmful gas from entering the interior of the vehicle cabin, the cooling fan may often functions as a blower that exhausts gas in a space around the battery from the vehicle (as disclosed, for example, in Japanese Patent Laid-Open Publication No. 2004-312920).

However, continuously driving the fan in a state where cooling of the battery or exhaust therearound is not required increases power consumption and reduces life of the fan, thus, undesirably reducing a vehicle travelable distance by using only electric power stored in the battery particularly for a plug-in hybrid car or an electric car. Therefore, a technology is desired of driving a fan in a minimally necessary manner, and exhausting a gas reliably and quickly in an occasion of detecting generation of a harmful gas is detected.

In order to deal with circumstances mentioned above, various technologies or means have been proposed such as:

a method in which a battery abnormality monitoring unit for detecting a battery abnormality state that may generate a gas is provided, and an exhaust fan is driven only when the battery abnormality monitoring unit detects an abnormality in a battery as disclosed in, for example, Japanese Patent No. 3864538 (Patent Document 3);

a method in which a ventilation fan is driven to vent air externally from an interior of a vehicle cabin when a voltage of one cell that constitutes a battery reaches a hydrogen gas generation voltage or more as disclosed in, for example, Japanese Patent Laid-Open Publication No. 6-217412 (Patent Document 4);

a layout of a battery exhaust structure and an exhaust pipe that allows a gas to be properly discharged from a vehicle cabin even in a collision of the vehicle as disclosed in, for example, Japanese Patent Laid-Open Publication No. 2007-320426 (Patent Document 5); and a method, in which when gas generation is detected, an air introduction valve is opened and then a ventilation fan is driven to increase gas exhaust efficiency as disclosed in, for example, Japanese Patent Laid-Open Publication No. 2004-312920 (Patent Document 6).

However, the technologies (1) to (4) (i.e., disclosed in the Patent Documents 3 to 6) provide the following defects or inconveniences.

First, in the technology (1) (Patent Document 3) and the technology (2) (Patent Document 4), an abnormality in the battery is judged based on a value measured by a voltage sensor or a temperature sensor, and thus, the exhaust fan is driven only after the battery falls into a dangerous state. Therefore, these technologies are not optimum methods particularly at a time of collision of a vehicle at which possibly quick gas exhaust is required.

The technology (3) (Patent Document 5) aims to ensure a gas exhaust path even in a collision of a vehicle, which is not applicable to solve the above-described defect.

The technology (4) (Patent Document 6) assumes exhaust of a hydrogen gas in a nickel hydrogen battery to improve increasing gas exhaust efficiency rather than preventing a gas from entering a vehicle cabin. However, the technology (4) is not an optimum method because it allows a certain amount of gas to enter the cabin when a CO gas highly toxic to human body is generated in a lithium ion battery.

Further, in a collision of a vehicle, it is highly likely that an abnormality such as disconnection occurs in a power supply system such as an exhaust fan or an air introduction valve and a drive circuit. However, the technologies (1), (2) and (4) do not pay attention for operating a device for exhausting a gas against such occasions.

Furthermore, since any consideration is not specifically paid to conditions for stopping the exhaust fan, even in an dangerous case of gas generation, for example, it is likely that an exhaust function stops when a driver turns off an ignition switch, or that the exhaust fan is not continuously driven when a gas is generated during external charging, and when the driver gets into a vehicle, the driver inhales the gas.

In view of the above technologies, there is still room for improvement.

SUMMARY

The disclosed embodiments were conceived in consideration of the circumstances encountered in the prior art mentioned above and the disclosed embodiments provide an exhaust system for a battery in a vehicle capable of quickly exhausting a gas generated by the high voltage battery from the vehicle when detecting a collision of the vehicle, preventing a gas generated due to an internal short-circuit, and optimally operating a gas exhaust function even when a failure such as disconnection due to a collision occurs.

One disclosed embodiment provides an exhaust system for a battery in a vehicle which includes a motor that drives wheels of the vehicle, a high voltage battery that supplies electric power to the motor, and an exhaust system that exhausts a gas generated by the high voltage battery from the vehicle, the exhaust system for a battery comprising:

an exhaust fan that exhausts the gas generated by the high voltage battery;

a control unit that controls operation of the exhaust fan; and a collision detection unit that detects a collision of the vehicle, wherein the control unit has a structure that operates the exhaust fan when the collision detection unit detects a collision of a vehicle.

In the above disclosed embodiment, the exhaust system for a battery may further comprise a first relay in which one end of a first relay switch is connected to the exhaust fan and another end of the relay switch is connected to a power supply line to which a power supply voltage is always supplied irrespective of a state of an ignition switch, wherein the power supply voltage is supplied to the exhaust fan when a control voltage from the control unit is not applied to a first relay coil and the exhaust fan is operated.

The exhaust system for a battery may further comprise, in addition to the above first relay and so on, a second relay in which one end of a second relay switch is connected to the exhaust fan and another end of the second relay switch is connected to the power supply line to which the power supply voltage is always supplied irrespective of the state of the ignition switch, wherein the collision detection unit is connected to a second relay coil, and the power supply voltage is supplied to the exhaust fan when the collision detection unit detects a collision, and the exhaust fan is operated.

According to one embodiment of the present exhaust system for the battery of a vehicle, the system includes a high voltage battery such as an electric automatic vehicle or a hybrid vehicle, which can quickly exhaust a gas generated by the high voltage battery from the vehicle when detecting a collision of the vehicle, prevent a gas generated due to an internal short-circuit of the high voltage battery in a collision from entering a cabin, and further optimally operate a gas exhaust function even when a failure such as disconnection due to a collision occurs or a driver turns off an ignition switch, or even when a gas is generated during external charging, that is, allowing a gas generated by the high voltage battery to be quickly exhausted from the vehicle when a collision of the vehicle occurs.

The nature and further characteristic features of the disclosed embodiments will be made clearer from the following descriptions made with reference to the accompanying drawings.

DESCRIPTION OF THE DISCLOSED EMBODIMENTS

Hereunder, disclosed embodiments will be described with reference to the accompanying drawings.

[First Disclosed Embodiment]

Figure 1:
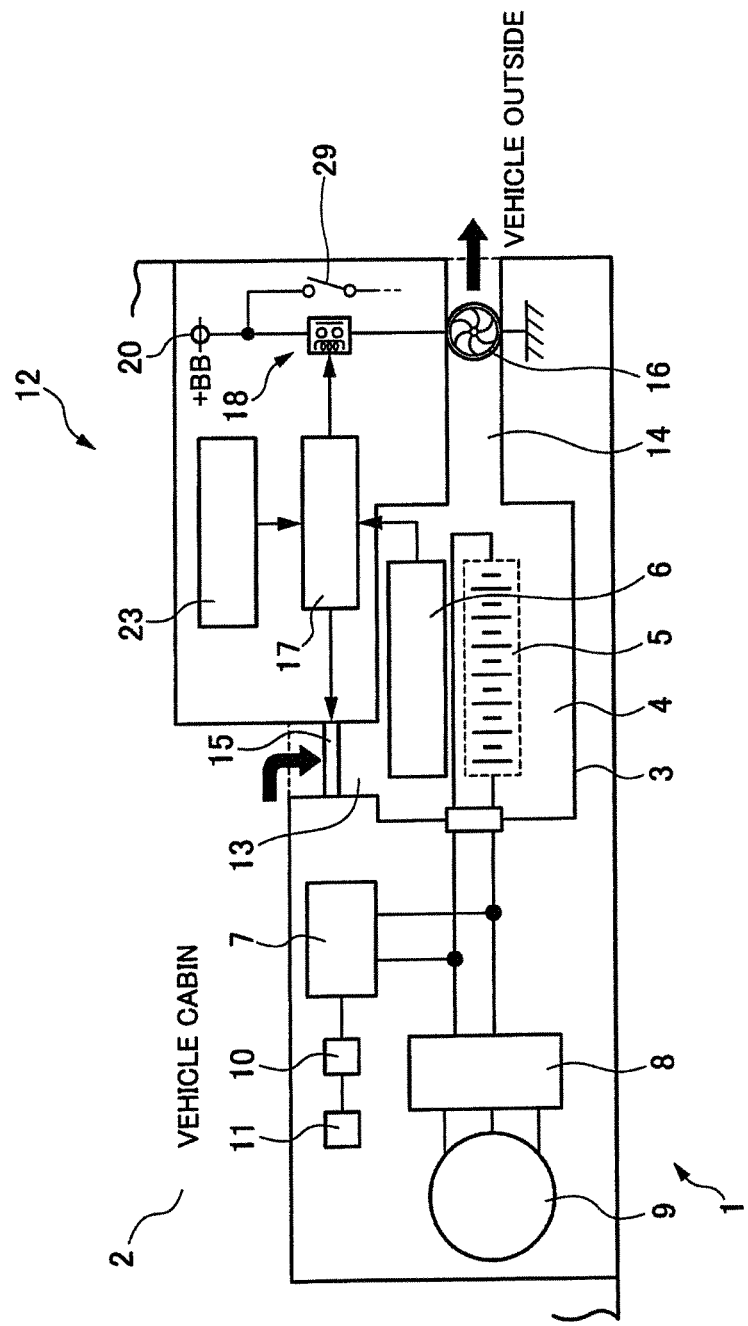
FIG. 1 is a diagram showing a system configuration (structure) of an exhaust system for a battery in a vehicle according to one disclosed embodiment.
Figure 2:
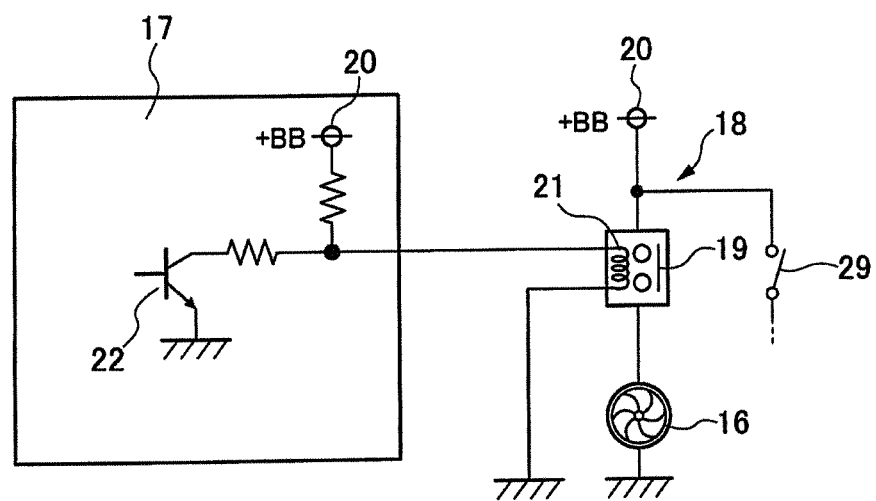
FIG. 2 is an electric circuit diagram of a control unit and a relay of the disclosed embodiment shown in FIG. 1.
Figure 3:
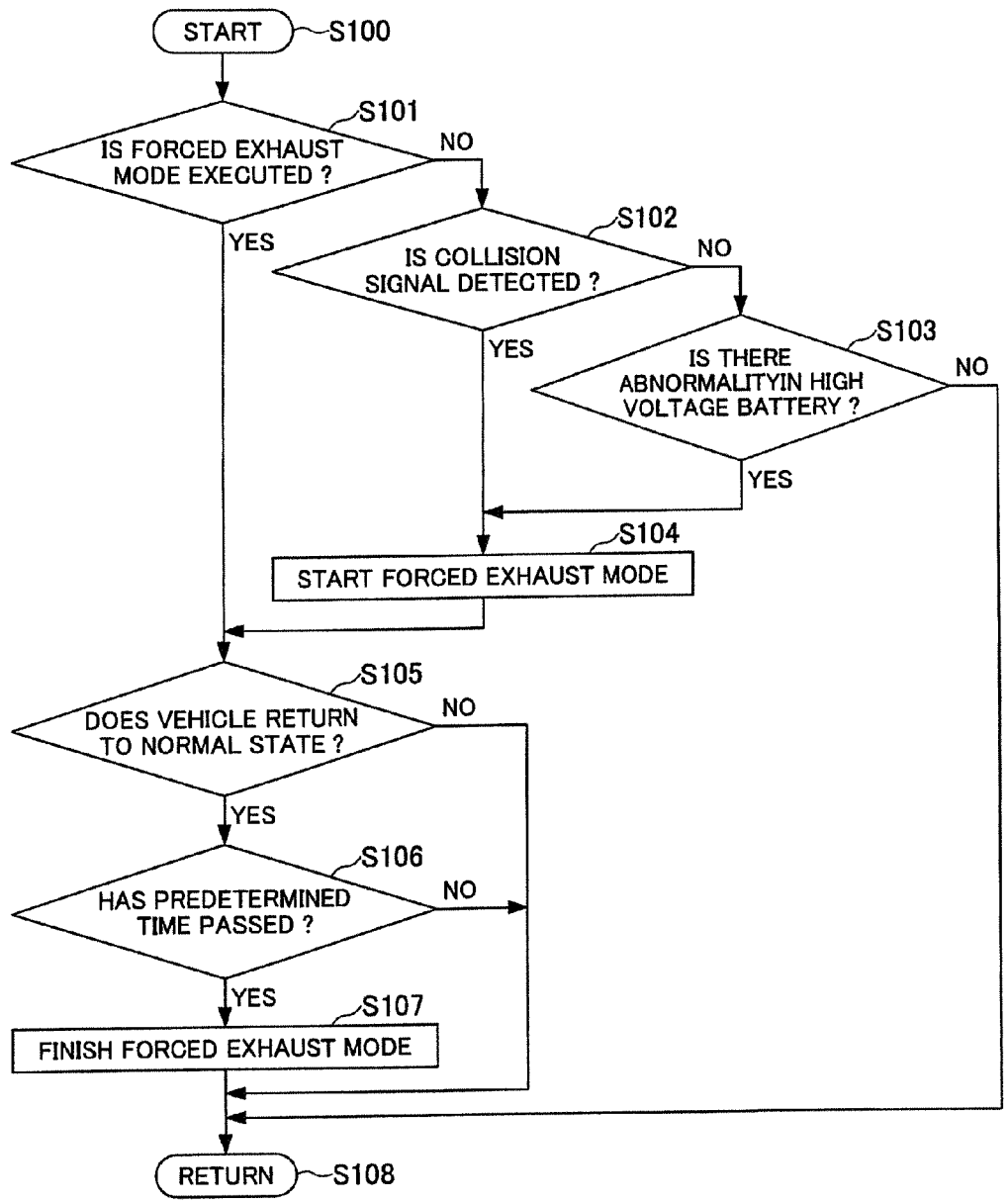
FIG. 3 is a flowchart of controlling the exhaust system for a battery in a vehicle according to the disclosed embodiment of FIG. 1.

FIGS. 1 to 3 show a first disclosed embodiment.

In FIG. 1, reference numeral 1 denotes a vehicle such as a hybrid car or vehicle or an electric car or vehicle. The vehicle 1 is provided with an internal cabin 2, in which a battery case 3 having a case space 4, a high voltage battery 5 and a battery control device 6 are disposed.

The case space 4 in the battery case 3 is partitioned from the cabin 2, and includes the high voltage battery 5 and the cell control device 6. The high voltage battery 5 supplies electric power via an inverter 8 to a motor 9 that drives wheels. The motor 9 is controlled by the inverter 8. A voltage of the high voltage battery 5 is reduced by a DC/DC converter 7, and supplied to a low voltage battery 10 and each of electric loads 11.

The cell control device 6 monitors a state of the high voltage battery 5 and controls charge and discharge of the high voltage battery 5 depending on driving states of the vehicle 1.

In a battery exhaust system 12 that exhausts a gas generated by the high voltage battery 5 from the vehicle, the case space 4 in the battery case 3 disposed in the high voltage battery 5 communicates with the cabin 2 through a cooling air blowing path 13 and communicates with the outside of the vehicle through a cooling air exhaust path 14.

An introduction valve 15 that introduces air in the cabin 2 into the case space 4 is provided on the cooling air blowing path 13. The case space 4 in the battery case 3 is spatially connected to an inside of the cabin 2 by opening the introduction valve 15 and spatially disconnected from the inside of the cabin 2 by closing the introduction valve 15. An exhaust fan 16 is disposed in the cooling air exhaust path 14. A gas in the case space 4 in the battery case 3 is exhausted from the vehicle by driving the exhaust fan 16.

The introduction valve 15 and the exhaust fan 16 are connected to a control unit 17 in the battery exhaust system 12 so as to be controlled in operation. The cell control device 6 is connected to the control unit 17. The cell control device 6 transmits a condition of the monitored high voltage battery 5 to the control unit 17.

The control unit 17 causes a closing operation of the introduction valve 15, and when the exhaust fan 16 is driven, a negative pressure is created in the case space 4 in the battery case 3 to prevent air in the battery case 3 from entering the cabin 2.

The introduction valve 15 is mechanically closed by a spring or an electromagnetic valve at normal time, and opened only when the introduction valve is electrically driven by the control unit 17 performing collective controlling of the vehicle 1. Thus, when disconnection due to collision of the vehicle 1 or the like makes it impossible to electrically control the introduction valve 15, the introduction valve 15 always takes a closed state.

The control unit 17 includes a first relay 18, and as shown in FIG. 2, the first relay 18 includes a relay switch 19 having one end connected to the exhaust fan 16 and having the other end thereof connected to a power supply line 20 to which a power supply voltage is always supplied irrespective of an on/off state of an ignition switch 29. The first relay also includes a relay coil 21 connected to the control unit 17.

Electric power is supplied from the low voltage battery 10 to the power supply line 20. The relay 18 is a b-contact relay in which the relay switch 19 is closed at a normal time and opened when the relay coil 21 is energized. The control unit 17 applies/stops a control voltage to the relay coil 21 by means of a transistor 22. In the relay 18, the relay switch 19 is closed when no control voltage is applied from the transistor 22 in the control unit 17 to the relay coil 21 (when the relay coil 21 is not energized), and a power supply voltage is then supplied to the exhaust fan 16 to operate the exhaust fan 16.

As mentioned above, the electric power is directly supplied from the low voltage battery 10 via the first relay 18 to the exhaust fan 16 through the power supply line 20.

On the other hand, the relay 18 is the b-contact relay in which the relay switch 19 is opened when a voltage is applied to the relay coil 21 (excitation side) and the relay coil 21 is energized, and the relay switch 19 is closed when no voltage is applied to the relay coil 21 (excitation side) and the relay coil 21 is opened and not energized. The relay coil 21 of the relay 18 is connected to the control unit 17, and pulled up in the control unit 17, and thus the relay 18 is always opened at a normal time. The control unit 17 can turn on the transistor 22 therein to ground the relay coil 21 of the relay 18 to thereby close the relay switch 19, whereby the control unit 17 can drive the exhaust fan 16 as occasion demands.

The battery exhaust apparatus 12 is provided with a collision sensor 23 as a collision detection unit that detects a collision of the vehicle 1. When the collision sensor 23 detects a collision, the collision sensor 23 transmits a collision signal to the control unit 17, and when the collision of the vehicle 1 is detected, the control unit 17 turns on the transistor 22 to close the relay switch 19 of the relay 18 to thereby operate the exhaust fan 16. In the relay 18, when the collision of the vehicle 1 causes disconnection or a ground fault between the relay coil 21 and the transistor 22, no voltage is applied to the relay coil 21, and the relay switch 19 is then closed to drive the exhaust fan 16.

Next, operation of the battery exhaust apparatus 12 will be described with reference to the flowchart of FIG. 3.

When a control program starts (step: S100), the battery exhaust system 12 in the vehicle 1 judges whether a control state of the introduction valve 15 and the exhaust fan 16 is under a forced exhaust mode (step: S101). Herein, the forced exhaust mode is a vehicle state where the introduction valve 15 is closed, the exhaust fan 16 is continuously driven with maximum output, and a warning lamp is displayed to inform a driver of an abnormality. In this judgment step (S101), when it is judged that the control state is under the forced exhaust mode, the process moves to a step (step: S105), and when it is judged that the control state is not under the forced exhaust mode (step: S101), the process moves to a step (step: S102).

When it is judged that the control state is not under the forced exhaust mode and judged as "NO" in the judgment (S101), it is judged whether a collision signal is detected from the collision sensor 23 (step: S102).

When it is judged that the collision signal is detected and judged as "YES" in the judgment (S102), the control state of the introduction valve 15 and the exhaust fan 16 is set to the forced exhaust mode to start the step at the forced exhaust mode (S104), and then the process moves to the step (S105).

On the other hand, when it is judged that no collision signal is detected as "NO" in the judgment (S102), it is judged whether there is an abnormality in the high voltage battery 5 based on information from the cell control device 6 (step: S103). Herein, the abnormality in the high voltage battery 5 means a case where there is detected a phenomenon that may lead to generation of a harmful gas such as overcharge or an internal short-circuit, and includes abnormality of overvoltage or large variations in voltage between battery cells.

In the judgment (S103), when it is judged that there is an abnormality in the high voltage battery 5 as "YES" in the step (S103), the introduction valve 15 and the exhaust fan 16 is controlled to have a state of the forced exhaust mode to start the forced exhaust mode (S104), and then the process moves to the step (S105). In the judgment of no abnormality in the high voltage battery 5 as "NO" in the step (S103), the current process is ended and the step returns (step: S108) to the step (S100).

When it is judged as "YES" in the step (S101), or when the forced exhaust mode is started (S104), it is judged whether the vehicle 1 returns to a normal state (S105), and it is judged that the vehicle 1 returns to the normal state in which no collision signal is detected from the collision sensor 23 and no abnormality is caused in the high voltage battery 5 in the judgment (S105).

In the judgment (S105), when either one of the collision signal and an abnormality in the high voltage battery 5 is detected and the vehicle 1 does not return to the normal state as "NO" in the judgment, the current process is ended and the step returns (step: S108) to the step (S100).

On the other hand, in the judgment (S105), when no collision signal and no abnormality in the high voltage battery 5 are detected and the vehicle 1 returns to the normal state as the judgment "YES", it is judged whether a predetermined time has passed after the vehicle 1 returns to the normal state (step: S106).

In this judgment (S106), when it is judged that the predetermined time has not passed and judged as "NO", the current process is ended while the forced exhaust mode of the introduction valve 15 and the exhaust fan 16 being maintained, and the process returns (step: S108) to the step (S100). On the other hand, in the judgment (S106), when it is judged that the predetermined time has passed and judged as "YES", the forced exhaust mode of the introduction valve 15 and the exhaust fan 16 are ended (step: S107) and then the current process is ended to the return step (S108) to the step (S100).

As mentioned above, the battery exhaust system 12 of the vehicle 1 of the present embodiment apparatus 12 includes the collision sensor 23 that detects a collision of the vehicle 1. When the collision sensor 23 detects the collision, the control unit 17 operates the exhaust fan 16 when the collision sensor 23 detects the collision, and at this occurrence, a gas generated by the high voltage battery 5 can be quickly exhausted from the vehicle.

Moreover, the battery exhaust system 12 also includes the first relay 18, and when the control voltage from the control unit 17 is not applied to the relay coil 21 of the relay 18, the relay switch 19 is closed and the power supply voltage is supplied to the exhaust fan 16 so as to operate the exhaust fan 16. Thus, even if a collision of the vehicle 1 causes disconnection or a ground fault of a control signal wire from the control unit 17, the gas generated by the high voltage battery 5 can be effectively exhausted from the vehicle 1.

Furthermore, in the battery exhaust system 12 of the present embodiment, since the other end of the relay switch 19 is connected to the power supply line 20 to which the power supply voltage is always supplied irrespective of the state of the ignition switch 29. Therefore, even if the ignition switch is turned off, the power supply voltage can be supplied to the exhaust fan 16, and the gas generated by the high voltage battery 5 can be exhausted from the vehicle 1.

In addition, in the battery exhaust system 12 of the vehicle 1, the introduction valve 15 is provided on the cooling air blowing path 13 that provides communication between the case space 4 in the battery case 3 and the vehicle cabin 2. Therefore, the cabin 2 and the battery case 3 can be spatially separated to prevent a harmful gas generated, for example, due to an internal short-circuit of the high voltage battery 5 at the collision of the vehicle 1 from entering the cabin 2.

Further, even during external charging time, the gas generated by the high voltage battery 5 can be exhausted from the vehicle.

[Second Embodiment]

Figure 4:
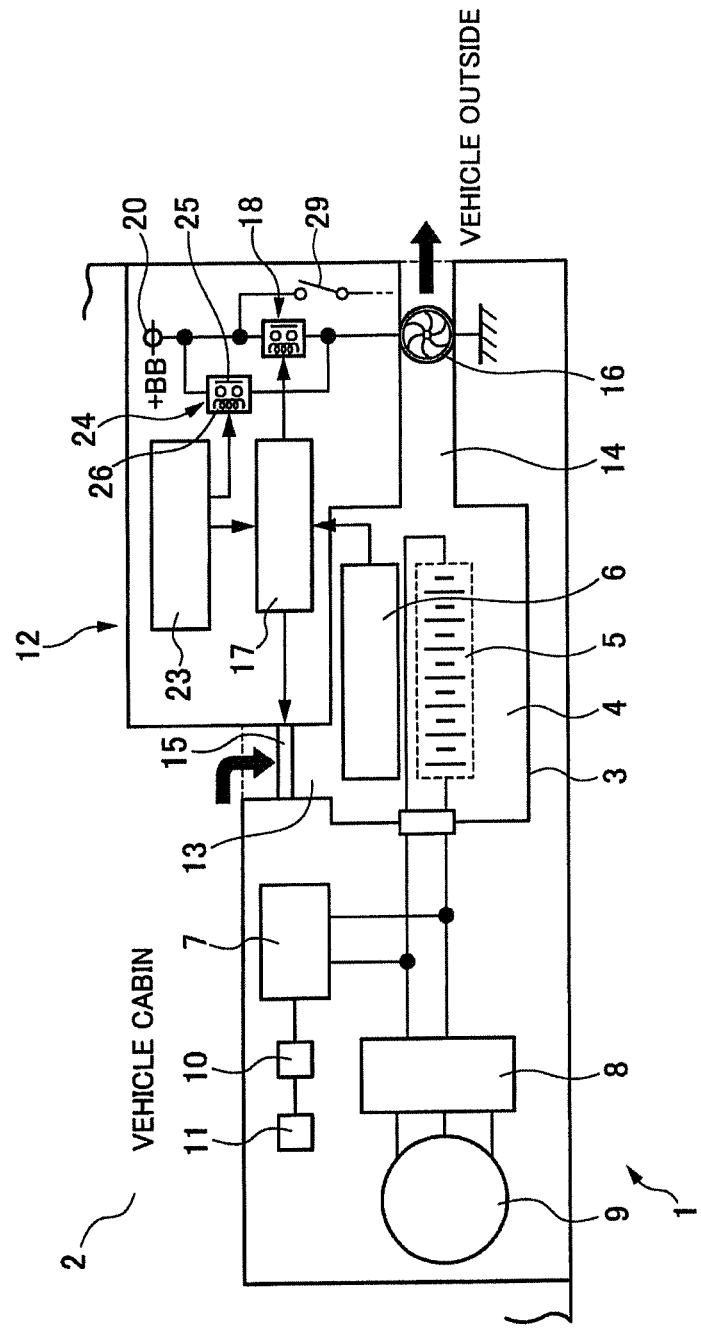
FIG. 4 is a diagram showing a system configuration (structure) of an exhaust system for a battery in a vehicle according to a second disclosed embodiment.

FIG. 4 shows a second embodiment, and in the illustration of FIG. 4, like reference numerals are added to members or portions corresponding to those of the first embodiment and duplicated descriptions are simplified or omitted herein.

A battery exhaust system apparatus 12 for a vehicle 1 of this second embodiment includes a second relay 24 in a control unit 17 in addition to the structure (arrangement) of that of the first embodiment shown in FIGS. 1 and 2. In the second relay 24, one end of a relay switch 25 is connected to an exhaust fan 16, and the other end of the relay switch 25 is connected to a power supply line 20 to which a power supply voltage is always supplied irrespective of an on/off state of an ignition switch 29, and a collision sensor 23 is connected to a relay coil 26.

The second relay 24 is connected to the exhaust fan 16 and the power supply line 20 in parallel with a first relay 18, and the relay switch 25 is opened at a normal time and closed when the relay coil 26 is energized.

In the battery exhaust system 12 of the second embodiment, when the collision sensor 23 detects a collision, the relay coil 26 is energized by a signal detected by and sent from the collision sensor 23, the relay switch 25 is closed and a power supply voltage is supplied to the exhaust fan 16 to thereby operate the exhaust fan 16. In this case, the second relay 24 has a circuit design so as to be always driven upon the detection of the collision by the collision sensor 23 detects a collision. Further, because of the control mode of the battery exhaust system of this second embodiment is substantially the same as in the flowchart for the first embodiment shown in FIG. 3, the duplicated descriptions thereof will be omitted herein.

As mentioned above, the battery exhaust system 12 in the vehicle 1 of this second embodiment includes the second relay 24 parallel to the first relay 18, and when the relay coil 26 of the relay 24 is energized by the detection signal from the collision sensor 23, the relay switch 25 is closed and a power supply voltage is supplied to the exhaust fan 16 to thereby operate the exhaust fan 16. This operation can increase redundancy to disconnection due to the collision of the vehicle 1, and hence surely exhaust the gas generated by the high voltage battery 5 outside from the vehicle 1.

Furthermore, in the battery exhaust system 12 of the vehicle 1 of the second embodiment, the other end of the relay switch 25 is connected to the power supply line 20 to which a power supply voltage is always supplied irrespective of the state of the ignition switch 29. Thus, even if the ignition switch is turned off, the power supply voltage can be supplied to the exhaust fan 16, and a gas generated by the high voltage battery 5 can be exhausted from the vehicle 1.

Moreover, even during external charging, the gas generated by the high voltage battery 5 can be exhausted from the vehicle.

[Modification]

The present invention is not limited to the above-disclosed embodiments and many other modifications or alternations may be allowable. Further, it is also to be noted that like reference numerals are added to members or portions corresponding to those of the above first and second disclosed embodiment, and duplicated descriptions thereof may be simplified or omitted herein.

Figure 5:
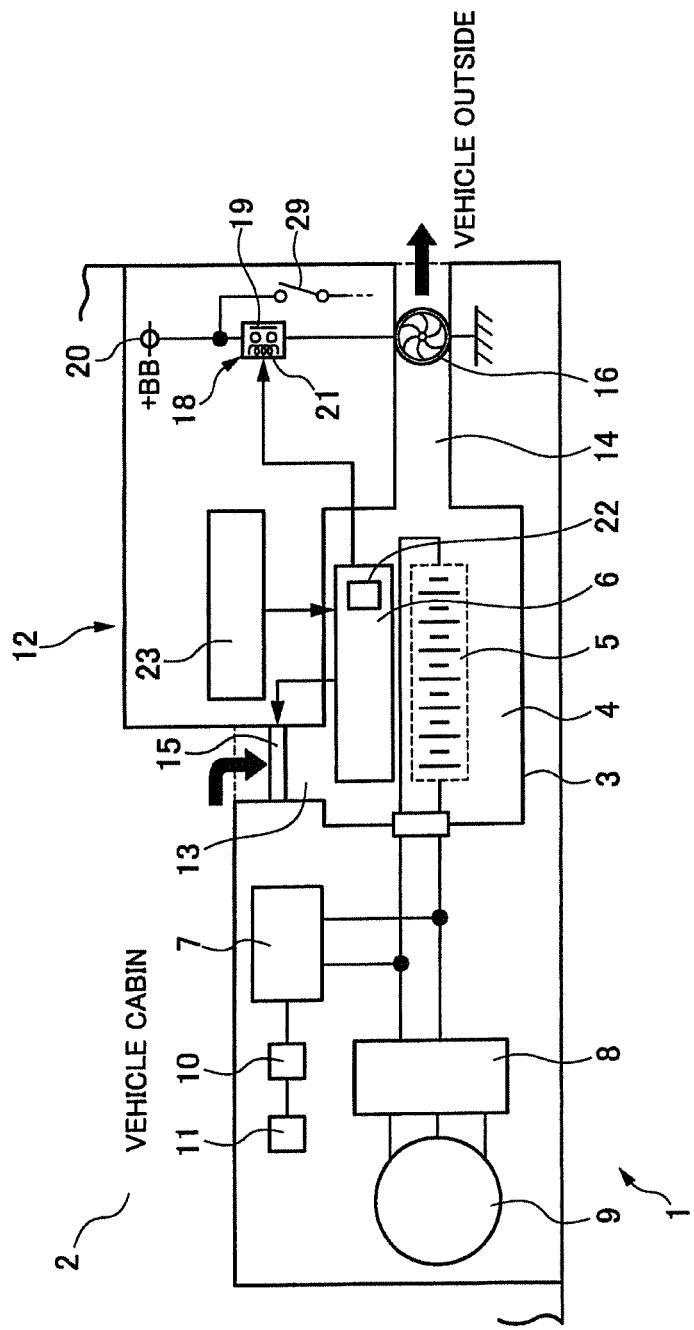
FIG. 5 is a diagram showing a system configuration (structure) of an exhaust system for a battery in a vehicle according to a first modified example.

FIG. 5 shows a first modification (first modified example).

In the battery exhaust system 12 of first embodiment described above, the control unit 17 controls the driving of the introduction valve 15 and the exhaust fan 16 by the detection signal from the collision sensor 23. In a battery exhaust system 12 for a vehicle 1 of the first modified example as shown in FIG. 5, a cell control device 6 controls the driving of an introduction valve 15 and an exhaust fan 16 in response to a detection signal from a collision sensor 23.

In the battery exhaust system 12 for the vehicle 1 of this first modified example, one end of a relay switch 19 of a first relay 18 is connected to the exhaust fan 16, the other end of the relay switch 19 is connected to a power supply line 20 to which a power supply voltage is always supplied irrespective of an on/off state of an ignition switch 29, and a relay coil 21 is connected to the cell control device 6. Electric power is supplied from a low voltage battery 10 to the power supply line 20. The relay 18 is a b-contact relay in which the relay switch 19 is opened when the relay coil 21 is energized.

The cell control device 6 applies/stops a control voltage to the relay coil 21 by means of a transistor 22 disposed therein. In the relay 18, the relay switch 19 is closed when any control voltage is not applied from the transistor 22 in the cell control device 6 to the relay coil 21 (when the relay coil 21 is not energized), and a power supply voltage is supplied to the exhaust fan 16 to thereby operate the exhaust fan 16.

In the battery exhaust system 12 of this first modified example, a collision sensor 23 is connected to the cell control device 6. When the collision sensor 23 detects a collision of the vehicle 1, the cell control device 6 stops application of the control voltage to the relay coil 21, and the relay switch 19 is then closed to operate the exhaust fan 16. In the relay 18, in an occasion where the collision of the vehicle 1 causes disconnection or a ground fault between the relay coil 21 and the transistor 22, no voltage is applied to the relay coil 21, and thus, the relay switch 19 is closed to drive the exhaust fan 16.

Further, since the control mode by the battery exhaust system 12 of the first modified example is substantially the same as that of the flowchart for the first embodiment shown in FIG. 3, the duplicated explanation thereof will be omitted herein.

According to the battery exhaust system 12 of this first modified example, since the cell control device 6 controls the driving of the introduction valve 15 and the exhaust fan 16 in response to the detection signal from the collision sensor 23, similar or substantially the same advantageous or functions to or as those obtained by the first embodiment described above will be achieved. In addition, the elimination of the control unit 17 may simplify the entire structure thereof.

Figure 6:
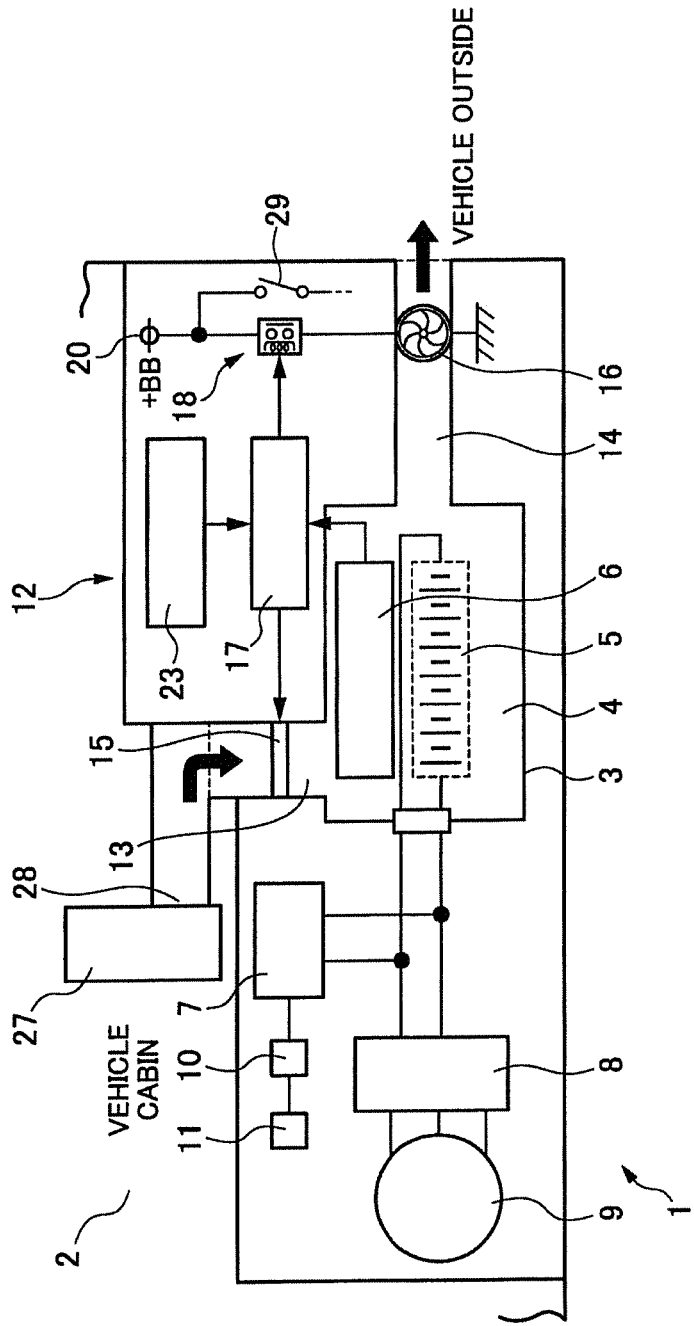
FIG. 6 is a diagram showing a system configuration (structure) of an exhaust system for a battery in a vehicle according to a second modified example.

FIG. 6 shows a second modified example (modification or alternation) of the battery exhaust system 12 of the vehicle 1. In the battery exhaust system 12 of the first embodiment, the air in the vehicle cabin 2 is blown through the cooling air blowing path 13 into the case space 4 in the battery case 3.

In a battery exhaust system 12 for a vehicle 1 of this second modified example, however, the cooling air blowing path 13 that communicates with the case space 4 in the battery case 3 is connected to an outlet 28 of cooling air or hot air of an air conditioner 27 for the vehicle 1. The other configurations are substantially the same as those in the first embodiment. The control mode by the battery exhaust system 12 of this second modified example is substantially the same as those mentioned with reference to the flowchart for the first embodiment shown in FIG. 3, and hence, the duplicated descriptions thereof will be omitted herein.

In the battery exhaust system 12 of this second modified example, the control unit 17 controls the driving of an introduction valve 15 and an exhaust fan 16 in response to a detection signal from a collision sensor 23, thereby achieving substantially the same advantages and functions as those of the first embodiment described above. Furthermore, the temperature of the high voltage battery 5 can be maintained by the cold air or hot air of the air conditioner 27 to a temperature for achieving high power generation efficiency thereof.

Figure 7:
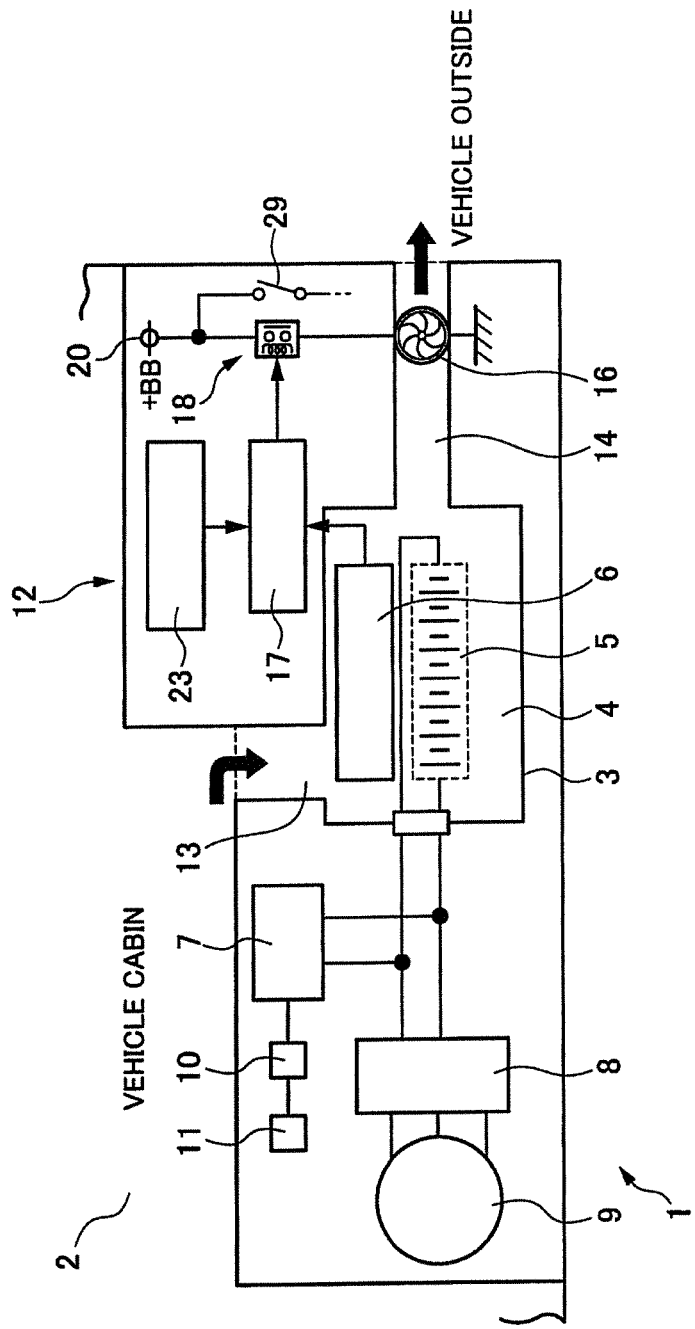
FIG. 7 is a diagram showing a system configuration (structure) of an exhaust system for a battery in a vehicle according to a third modified example.

FIG. 7 shows a third modified example of the battery exhaust system 12.

In the battery exhaust system 12 of the first embodiment, the introduction valve 15 is provided on the cooling air blowing path 13, and when the introduction valve 15 is opened, the inside of the vehicle cabin 2 is spatially connected to the case space 4 in the battery case 3, and when the introduction valve 15 is closed, the inside of the vehicle cabin 2 is spatially disconnected from the case space 4 in the battery case 3.

On the other hand, a battery exhaust system 12 for a vehicle 1 according to this third modified example is not provided with such introduction valve 15 on the cooling air blowing path 13. In this structure, an exhaust fan 16 may be provided on the cooling air blowing path 13 or a cooling air exhaust path 14. Control mode by the battery exhaust system 12 according to this third modified embodiment is substantially the same as that mentioned with reference to the flowchart for the first embodiment shown in FIG. 3, and hence, the duplicated descriptions thereof will be omitted herein. However, only the exhaust fan 16 is driven in a forced exhaust mode.

According to the battery exhaust system 12 of the third modified example, the control unit 17 controls the driving of the exhaust fan 16 in response to the detection signal from the collision sensor 23, whereby the same advantages and functions as those obtained by the first embodiment will be also obtained by this third modified example. In addition, the elimination of the introduction valve 15 may simplify a structure, thus being convenient.

As mentioned hereinabove, according to the exhaust system for a battery in a vehicle of the disclosed embodiments and modifications can quickly exhaust a gas generated by the high voltage battery from the vehicle upon an occurrence of a collision of the vehicle.

It is further to be noted that the present invention is not limited to the described embodiments and modifications, and many other changes and alternations may be made without departing from the scopes of the appended claims.

For example, the battery exhaust system may be applied to a power supply system for a vehicle such as an electric car or vehicle as well as a hybrid car or vehicle which is mounted with an engine.

What is claimed is:

1. An exhaust system for a battery in a vehicle which includes a motor that drives wheels of the vehicle, a high voltage battery that supplies electric power to the motor, and an exhaust system that exhausts a gas generated by the high voltage battery from the vehicle, the exhaust system for a battery comprising:
an exhaust fan that exhausts the gas generated by the high voltage battery;
a control unit that controls operation of the exhaust fan;
a collision detection unit that detects a collision of the vehicle;
a first relay having a first relay switch,
wherein the control unit has a structure that operates the exhaust fan when the collision detection unit detects a collision of the vehicle, and
wherein the first relay switch has one end connected to the exhaust fan and has another end connected to a power supply line to which a power supply voltage is always supplied irrespective of a state of an ignition switch, wherein the power supply voltage is supplied to the exhaust fan when a control voltage from the control unit is not applied to a first relay coil and the exhaust fan is operated.

2. The exhaust system for a battery in a vehicle of claim 1, further comprising a second relay having a second relay switch in which the second relay switch has one end connected to the exhaust fan and has another end connected to the power supply line to which the power supply voltage is always supplied irrespective of the state of the ignition switch, wherein the collision detection unit is connected to a second relay coil, and the power supply voltage is supplied to the exhaust fan when the collision detection unit detects a collision, and the exhaust fan is operated.

\* \* \* \* \*